United States Patent
Caplan et al.

[19]

[11] Patent Number: 6,163,413
[45] Date of Patent: *Dec. 19, 2000

[54] LIGHT-WEIGHT THREE-ELEMENT CLINICAL VIEWER

[75] Inventors: Charles Howard Caplan, Middleton, Wis.; Richard A. Buchroeder, Tuscon, Ariz.

[73] Assignee: Surgical Acuity, Inc., Madison, Wis.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/876,771

[22] Filed: Jun. 16, 1997

Related U.S. Application Data

[63] Continuation of application No. 08/482,647, Jun. 7, 1995, abandoned, which is a continuation of application No. 08/114,870, Aug. 31, 1993, Pat. No. 5,463,500.

[51] Int. Cl.$^7$ .............................. G02B 13/00; G02B 23/00
[52] U.S. Cl. ......................... 359/744; 359/362; 359/399
[58] Field of Search ................................. 359/362, 367, 359/399, 404, 407, 642–643, 744, 793, 795; 351/45, 51, 57, 158

[56] References Cited

U.S. PATENT DOCUMENTS

| | | | |
|---|---|---|---|
| 1,197,742 | 9/1916 | Kellner | 359/744 |
| 1,395,822 | 11/1921 | Hastings | 359/399 |
| 1,507,111 | 9/1924 | Erfle | 359/744 |
| 1,851,579 | 3/1932 | Hixon | 359/411 |
| 2,582,085 | 1/1952 | Tolle | 359/744 |
| 2,728,266 | 12/1955 | Tolle | 359/744 |
| 3,273,456 | 9/1966 | Feinbloom | 359/481 |
| 3,438,689 | 4/1969 | Wehr | 359/422 |
| 3,936,152 | 2/1976 | Aurin et al. | 359/733 |
| 4,070,098 | 1/1978 | Buchroeder | 359/725 |
| 4,278,330 | 7/1981 | Buchroeder | 359/676 |
| 4,364,645 | 12/1982 | Feinbloom | 351/204 |
| 4,498,743 | 2/1985 | Feinbloom | 351/45 |
| 4,555,164 | 11/1985 | Feinbloom | 359/670 |
| 4,557,567 | 12/1985 | Azumi et al. | 359/683 |
| 4,621,283 | 11/1986 | Feinbloom | 348/77 |
| 4,863,468 | 9/1989 | Feinbloom et al. | 623/6 |
| 5,090,796 | 2/1992 | Feinbloom | 351/158 |
| 5,129,717 | 7/1992 | Feinbloom | 351/158 |
| 5,196,028 | 3/1993 | Portney et al. | 623/6 |
| 5,291,229 | 3/1994 | Feinbloom | 351/57 |
| 5,381,263 | 1/1995 | Nowak et al. | 359/411 |
| 5,394,272 | 2/1995 | Kvamme et al. | 359/744 |
| 5,463,500 | 10/1995 | Buchroeder | 359/362 |

FOREIGN PATENT DOCUMENTS

| | | | |
|---|---|---|---|
| 57718 | 9/1967 | German Dem. Rep. | 359/744 |
| 561572 | 10/1932 | Germany | 359/744 |
| 728514 | 11/1942 | Germany | 359/744 |

*Primary Examiner*—Thong Nguyen
*Attorney, Agent, or Firm*—Fitch, Even, Tabin & Flannery

[57] ABSTRACT

The light-weight clinical viewer includes a two-element objective lens and a single-element eyepiece lens. Use of multiple lenses allows for a more compact package. The doublet objective serves to reduce vignetting while providing a wide field of view and reduced chromatic aberration. Image quality is further enhanced, while keeping the weight of the viewer down, through the use in the objective of light-weight high index glass. Moreover, the invention permits the use of a single mounting barrel assembly for different eyepieces to reduce manufacturing costs.

10 Claims, 2 Drawing Sheets

LIGHT-WEIGHT THREE-ELEMENT CLINICAL VIEWER

CROSS REFERENCE TO RELATED APPLICATION

This is a Continuation Application of Application No. 08/482,647 filed on Jun. 7, 1995, now abandoned, which is a Continuation Application of Application No. 08/114,870, filed on Aug. 31, 1993, now issued U.S. Pat. No. 5,463,500. The invention of the present application is further related to Application No. 08/480,263 filed on Jun. 7, 1995, now issued U.S. Pat. No. 5,790,323, which is a Continuation Application of Application No. 08/115,166 filed on Aug. 31, 1993, now issued U.S. Pat. No. 5,515,209, which was filed on even date and assigned to the same assignee as the assignee of Application No. 08/114,870.

This invention is related to an application entitled "LIGHT-WEIGHT HIGH-MAGNIFICATION CLINICAL VIEWER", Ser. No. 08/115,166, filed on even date herewith and assigned to the same assignee as the assignee of the present invention, now U.S. Pat. No. 5,515,209.

BACKGROUND OF THE INVENTION

A. Field of the Invention

The present invention relates to magnification viewers worn by surgeons and dentists. In particular, it relates to a compact, light-weight, comfortable-to-wear, high magnification viewer having an extremely wide field of view and good image quality.

B. Description of the Prior Art

Magnification viewers are worn by dentists and surgeons for extended periods of time during clinical procedures so as to provide clarity of view while avoiding a "hunched-over" position that can result in debilitating neck and back strain, which can have an adverse effect on the success of the operation. By permitting the clinician to operate at a greater working distance from the patient, higher magnification viewers also reduce the clinician's exposure to aerosols.

Because clinicians use magnification viewers during surgery and other procedures requiring manual precision, it is important that they be light-weight, comfortable, and have good clarity and wide field of vision while providing high magnification.

Clinical magnification viewers are generally made according to the "Galilean telescope" design, having a single objective lens and a single eyepiece lens. Galilean telescopes are characterized by relatively narrow fields of view which are mainly limited by the diameter of the objective lens. The basic Galilean design, however, produces substantial chromatic aberration ("coloring") and, hence, poor image quality.

The magnification, or power, of a Galilean telescope is proportional to the focal length of the objective and inversely proportional to the focal length of the eyepiece. Overall viewer length is proportional to the sum of the focal lengths of the objective and eyepiece.

Since the viewer should be kept as short as possible to reduce torque on the nose and wearer discomfort, an eyepiece with a shorter focal length is usually employed when an increase in magnification is desired. However, to retain a good field of view without vignetting, the diameter of the objective must be increased. If this is done while keeping the focal length of the objective the same, the "speed" of the lens increases, which results in a lower resolution quality. It also mandates an excessively large package. One method of overcoming the "speed" problem is to use a more complicated objective lens, though at the cost of greatly increased weight and strain and discomfort to the wearer.

The so-called Kellner design (from Kellner, U.S. Pat. No. 1,197,742 "Lens System") in general use today contains a heavy doublet objective and a singlet eyepiece lens. While image quality is adequate at lower magnifications, at higher magnifications, excessive coloring results in poor image quality. Moreover, the field of view is relatively limited.

It is known that image quality in prior art magnification viewers can be enhanced by the use of "very high index flint glass". However, this method has not been in general use, since "very high index flint glass" makes the viewer too heavy for practical use.

Finally, prior art magnification viewers require lens mounting barrels of differing sizes in order to provide a wide range of focusing or working distances. As such, the manufacturing costs for prior art viewers are relatively high.

SUMMARY OF THE INVENTION

Accordingly, it is an object of the present invention to provide a compact, light-weight, high-resolution, high-magnification viewer with a wide field of view that is comfortable to wear over extended periods of time.

A further object of the present invention is to provide a magnification viewer having better color quality than prior art magnification viewers.

A further object of the invention is to provide a magnification viewer having a wider field of view even at high magnification levels than the prior art magnification viewers.

A further object of the present invention is to provide a higher resolution magnification viewer while maintaining small diameter lenses than prior art magnification viewers.

A further object of the present invention is to provide a more compact magnification viewer than prior art viewers.

A further object is to provide a lighter-weight magnification viewer having superior image quality than previous magnification viewers.

A further object of the present invention is to provide a magnification viewer having relatively light lens elements while improving image quality using high index glass.

A further object of the invention is to provide method for making a magnification viewer in which all lenses for an entire series of working distances require just a single mounting barrel assembly.

In accordance with one embodiment of the invention, the magnification viewer includes a two-element objective lens and a single-element eyepiece lens. Use of multiple lenses allows for a more compact package. The doublet objective serves to reduce vignetting while providing a wide field of view and reduced chromatic aberration. Image quality is further enhanced, while keeping the weight of the viewer down, through the use in the objective of light-weight high index glass. Moreover, the invention permits the use of a mounting barrel of a common size for a series of working distances.

DESCRIPTION OF THE DRAWINGS

FIG. 3b is an end view of the mounting barrel illustrated in FIG. 3a.

DETAILED DESCRIPTION OF THE INVENTION

Figure 1:
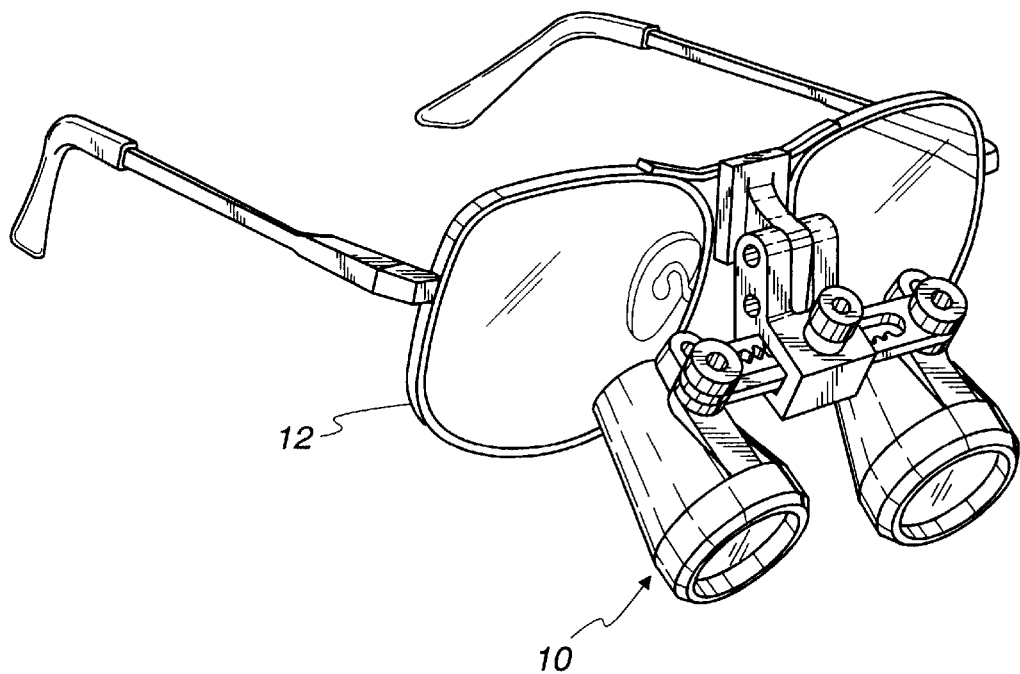
FIG. 1 is a perspective drawing of the viewer as attached to a pair of glasses.

One embodiment of the present invention, FIG. 1, includes a pair of magnification viewers 10, attached to a pair of eyeglasses, 12.

Figure 2:
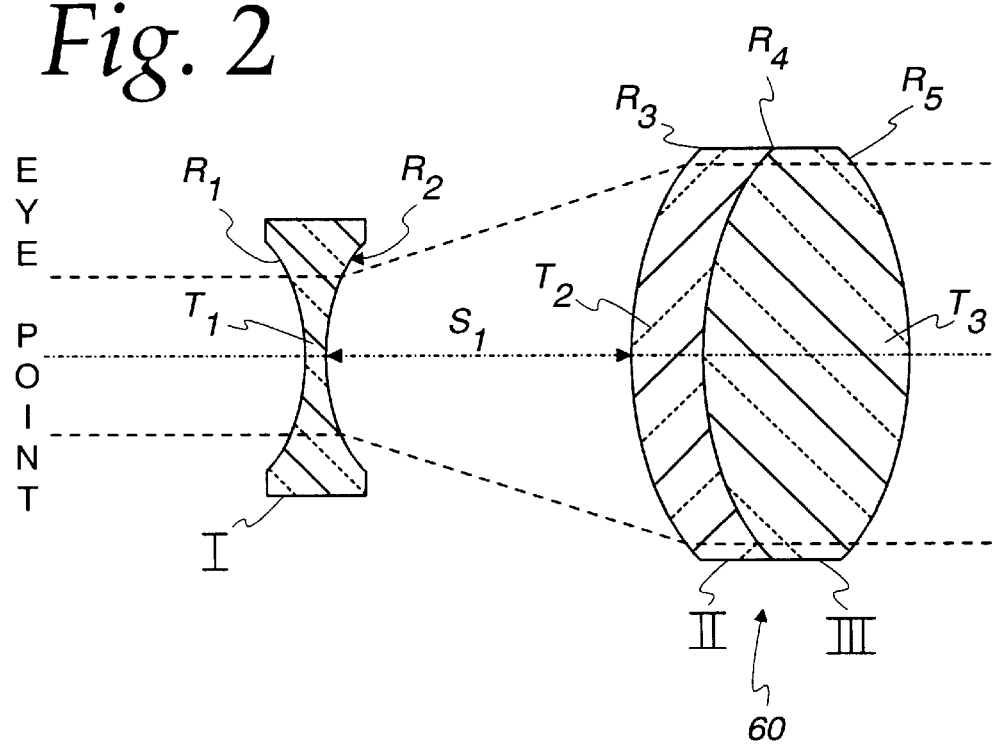
FIG. 2 is a diagram illustrating the viewer having a two-element objective and a single-element eyepiece.

Optics for the magnification viewer 10 are shown in FIG. 2. The viewer according to the invention includes a single-element eyepiece lens including element I and a two-element objective lens including elements II–III. R1, R2, etc. represent the radii of respective refractive surfaces; $S_1$ represents the thicknesses of the air space; and $T_1$, $T_2$ etc. represent the thicknesses of the lens elements.

The magnification viewer could be made of a single eyepiece and a single objective lens. However, chromatic aberrations would result in poor image quality. In the alternative, the objective lens could be made a doublet, as in the Kellner system. However, the Kellner system provides relatively poor image quality.

Image quality can be improved through the use of very high index flint glass in element II of the objective lens. However, this has not been done in the past since the use of very high index flint glass, coupled with a greater number of lens elements, of course, greatly increases the weight of the viewer which, again, is undesirable (e.g., standard very high index flint glass, such as Schott Optical Glass Company type SF6 has a specific gravity of 5.18 grams per cubic centimeter).

Consequently, the invention uses "light-weight high index glass" of the type available from various manufacturers such as Schott and Ohara (e.g., Schott type SFL6, which has a specific gravity of only 3.37 grams per cubic centimeter). The resulting doublet is reduced in weight while providing reduced aberrations and higher image quality.

The invention provides advantages in the manufacturing process, as well. Prior art magnification viewers have been designed such as to require mounting barrels of differing sizes in order to achieve a range of working distances, which result from variations in the radii of curvature of the various lenses.

Figure 3A:
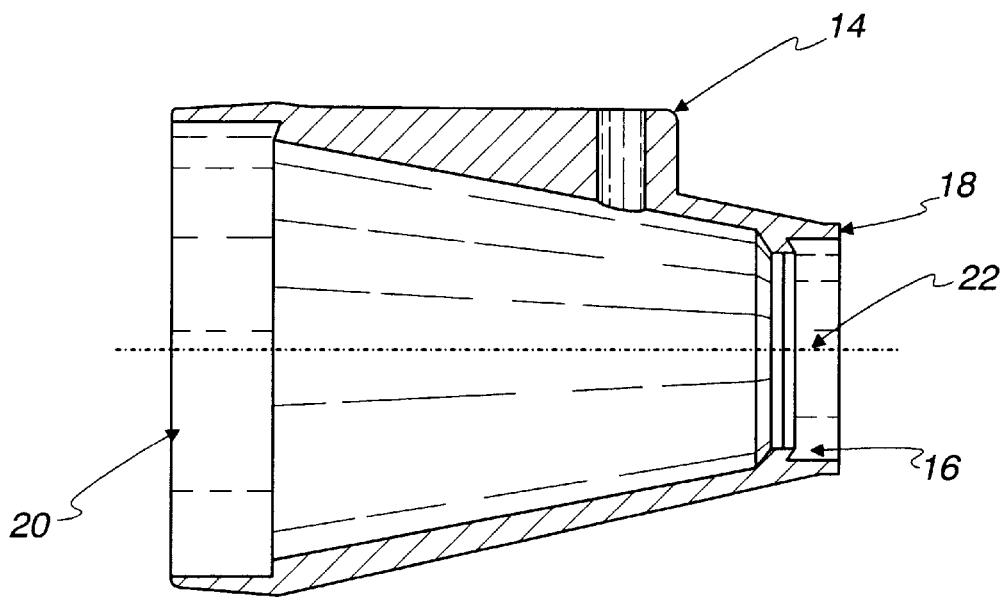
FIG. 3a is a sectional view of the mounting barrel of the magnification viewer.
Figure 3B:
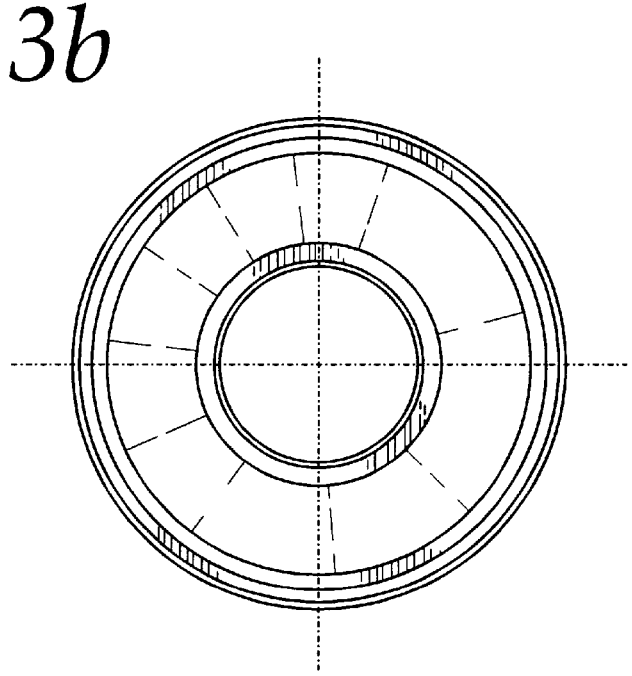

A sectional view of the mounting barrel 14 is shown in FIG. 3a; an end view is shown in FIG. 3b. It is known that the radii of curvature for the various lens elements used in the doublet objective are kept the same for viewers of differing working distances. Thus, to change the viewer's working distance, the radii of curvature of the eyepiece, lens element I (See also FIG. 2), must be altered. However, in order to reduce manufacturing costs, a method in accordance with one aspect of the present invention is disclosed in which only the exterior radius of curvature $R_1$ of lens element I is changed. The interior radius of curvature $R_2$ of lens element I is kept constant. This allows for the use across various working distances of only one mounting barrel 14, having an inner rim 16 (FIG. 3) sized to accept an eyepiece having that single interior radius of curvature $R_2$. Thus, by designing several eyepiece lenses that have the same radius of curvature $R_2$ facing the same doublet objective, and changing only radius of curvature $R_1$, all lenses for an entire series of working distance require just a single mounting barrel assembly. This allows for a reduction in both manufacturing cost and complexity.

The objective lens 60 is mounted at one end 20 of the mounting barrel 14. The eyepiece lens I is mounted at the opposite end 22. Both are sealed in place in a conventional manner. The eyepiece lens I is fixed in place such that its face having the constant radius of curvature $R_2$ fits within the mounting barrel facing the doublet objective.

Exemplary construction data for a viewer built according to the preferred embodiment shown in FIG. 2 are given in TABLE 1, TABLE 2, and TABLE 3. These represent, respectively, the "Viewer with Exemplary Standard Working Distance", "Viewer with Exemplary Long Working Distance", and "Viewer with Exemplary Extra Long Working Distance" configurations.

TABLE 1

Viewer with Exemplary Standard Working Distance

| Element | $n_d$ | $v_d$ | Radius | Thickness | Separation |
|---|---|---|---|---|---|
| I | 1.517 | 66.2 | $R_1$ = 55.780 | $T_1$ = 1.0 | $S_1$ = 21.14 |
|  |  |  | $R_2$ = 25.110 |  |  |
| II | 1.805 | 25.4 | $R_3$ = 93.987 | $T_2$ = 1.5 |  |
|  |  |  | $R_4$ = 48.006 |  |  |
| III | 1.517 | 64.2 | $R_4$ = 48.006 | $T_3$ = 6.5 |  |
|  |  |  | $R_5$ = 30.240 |  |  |

TABLE 2

Viewer with Exemplary Long Working Distance

| Element | $n_d$ | $v_d$ | Radius | Thickness | Separation |
|---|---|---|---|---|---|
| I | 1.517 | 64.2 | $R_1$ = 49.030 | $T_1$ = 1.0 | $S_1$ = 21.14 |
|  |  |  | $R_2$ = 25.110 |  |  |
| II | 1.805 | 25.4 | $R_3$ = 93.987 | $T_2$ = 1.5 |  |
|  |  |  | $R_4$ = 48.006 |  |  |
| III | 1.517 | 64.2 | $R_4$ = 48.006 | $T_3$ = 6.5 |  |
|  |  |  | $R_5$ = 30.241 |  |  |

TABLE 3

Viewer with Exemplary Extra Long Distances

| Element | $n_d$ | $v_d$ | Radius | Thickness | Separation |
|---|---|---|---|---|---|
| I | 1.517 | 64.2 | $R_1$ = 44.860 | $T_1$ = 1.0 | $S_1$ = 21.14 |
|  |  |  | $R_2$ = 25.110 |  |  |
| II | 1.805 | 25.4 | $R_3$ = 93.987 | $T_2$ = 1.5 |  |
|  |  |  | $R_4$ = 48.006 |  |  |
| III | 1.517 | 64.2 | $R_4$ = 48.006 | $T_3$ = 6.5 |  |
|  |  |  | $R_5$ = 30.240 |  |  |

The radius, thickness, and separation dimensions are given in millimeters. Roman numerals identify the lens elements in their respective order from the eyepoint side to the object side; $n_d$ represents the refractive index of each element; $v_d$ is the Abbe dispersion number; $R_1$, $R_2$, etc., represent the radii of the respective refractive surfaces, in order, from the eyepoint side to the object side; $T_1$ and $S_1$ etc., represent the thicknesses of the lens elements and air spaces, respectively, from the eyepoint side to the object side, $T_1$ being the thickness of the first element I and $S_1$ being the thickness of the airspace between I and II. The thicknesses $T_1$ and $S_1$ etc. are measured along the optical centerline.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A light-weight magnification viewer for use with a pair of spectacles comprising: a pair of lens barrels, each of said lens barrels supporting a one element negative eyepiece lens and a two element objective lens forming a doublet, said eyepiece lens and said doublet objective lens for magnifying images, said doublet objective lens having a positive element and a negative element, wherein said negative element of said doublet, and no other element, is formed from a light weight high index glass having a specific gravity of less than 5 grams per cubic centimeter for reducing weight of said doublet, and said negative and positive elements of said objective lens having indices of refraction that differ by more than 15%; and means for mounting said pair of lens barrels to a pair of spectacles for providing higher image quality to a user.

2. The magnification viewer of claim 1, wherein said negative element has a dispersion of about $v_d$=25.4 and an index of refraction of about $n_d$=1.805.

3. The magnification viewer of claim 2, wherein said positive element has a dispersion of about $v_d$=64.2 and an index of refraction of about $n_d$=1.517.

4. A light-weight magnification viewer in accordance with claim 1, wherein said negative element of said doublet has a dispersion of about $v_d$=25.4 and an index of refraction of about $n_d$=1.805, and said positive element has a dispersion of about $v_d$=64.2 and an index of refraction of about $n_d$=1.517 and a thickness of about 6.5 millimeters along the optical center line.

5. The light-weight magnification viewer in accordance with claim 4 wherein a biconcave lens is used as the eyepiece lens, and a viewer's working distance is changed solely by using a biconcave lens with an altered exterior radius of curvature.

6. The light-weight magnification viewer in accordance with claim 1 wherein a biconcave lens is used as the eyepiece lens, and a viewer's working distance is changed solely by using a biconcave lens with an altered exterior radius of curvature.

7. A light-weight magnification viewer for use with a pair of spectacles comprising: a pair of lens barrels, each of said lens barrels supporting a one element biconcave eyepiece lens at one end thereof and a positive compound objective at the other end thereof with an air space therebetween of about 21 millimeters, said eyepiece lens and said objective for magnifying images, said objective having a positive element and a negative element, wherein said negative element of said objective and no other element, is formed from a light weight, high-index glass having a specific gravity of less than 5 grams per cubic centimeter for reducing the weight of said objective, and said negative and positive elements having indices of refraction that differ by more than 15%; and means for mounting said pair of lens barrels to a pair of spectacles for providing higher image quality to a user.

8. The light-weight magnification viewer in accordance with claim 7 wherein said indices of refraction differ by less about 18.9%.

9. The light-weight magnification viewer in accordance with claim 7 wherein during manufacture a viewer's working distance is changed solely by using an eyepiece lens in which the exterior radius of curvature of the eyepiece lens is changed.

10. A method of changing a working distance of a light-weight magnification viewer during assembly, comprising the steps of: supporting a two element objective lens forming a doublet at one end of a lens barrel, said doublet objective lens having a positive element and a negative element, wherein said negative element and no other element, is formed from a light weight high index glass having a specific gravity of less than 5 grams per cubic centimeter for reducing weight of said doublet, and said negative and positive elements having indices of refraction that differ by more than 15%; and mounting a biconcave eyepiece lens at the other end of the barrel having an exterior radius that is selected to set the working distance of the viewer.

* * * * *